United States Patent [19]

Lelaidier et al.

[11] 3,889,172
[45] June 10, 1975

[54] METHOD AND APPARATUS FOR LIMITING CHARGE OF A STORAGE BATTERY CHARGED AT A CONSTANT VOLTAGE

[75] Inventors: Daniel Lelaidier, Clamart; Jean Quobex, Paris, both of France

[73] Assignee: Saft-Societe des Accumulateurs Fixes et de Traction, Romainville, France

[22] Filed: Oct. 11, 1973

[21] Appl. No.: 405,636

[30] Foreign Application Priority Data
Oct. 13, 1972  France .............................. 72.36372

[52] U.S. Cl. ................ 320/39; 317/36 TD; 317/50; 320/31; 320/48
[51] Int. Cl. ........................... H02j 7/00; H02h 3/08
[58] Field of Search ............ 320/35, 39, 40, 48, 23, 320/20, 31; 317/50, 33 C, 29, 9 B, 36 TD

[56] References Cited
UNITED STATES PATENTS
3,213,323  10/1965  Circle ................................ 317/50 X
3,594,557  7/1971  Anderson ........................ 317/36 TD
3,673,455  6/1972  Dewey .......................... 317/33 C X

FOREIGN PATENTS OR APPLICATIONS
1,438,002  10/1968  Germany .............................. 320/46
1,227,630  4/1971  United Kingdom ................... 320/23

Primary Examiner—J. D. Miller
Assistant Examiner—Robert J. Hickey
Attorney, Agent, or Firm—Kenyon & Kenyon Reilly Carr & Chapin

[57] ABSTRACT

Method for charging, at a constant voltage, a storage cell battery liable to thermal runaway at the end of charge. The charge current is lowered or shut off at the instant when the derivative of the charge current as a function of the time uses above a predetermined value. This method enables avoidance of all thermal racing phenomena applied to alkaline storage cell batteries, intended more particularly for aircraft. Analog processing and logic processing circuits for signals derived from measurement circuits of the charge current of the battery connected with charge feeding of the battery for control of the charge current are described.

34 Claims, 7 Drawing Figures

METHOD AND APPARATUS FOR LIMITING CHARGE OF A STORAGE BATTERY CHARGED AT A CONSTANT VOLTAGE

RELATED APPLICATIONS

No related applications are co-pending.

BRIEF SUMMARY OF INVENTION

The invention concerns a method for limiting the charge of a storage cell battery charged at a constant voltage and devices putting into application the said method.

When a storage cell battery is charged at a constant voltage, it is observed that the intensity of the charge current, after having reached a high value at the beginning of the charge, decreases progressively to decrease fairly sharply on approaching the end of the charge. That decrease in the current is explained by the fact that as the charge advances, the equivalent internal resistance (which includes the actual ohmic resistance and the various other resistances due, for example, to the polarization of the electrode and to the concentration polarizations) increases.

If, for any reason, there occurs at the end of charge or in overcharge a rise in the temperature, that rise will have the effect of decreasing the equivalent internal resistance and this will cause a correlative increase in the intensity of the charge current. As the original cause of the rise in temperature subsists, its effects will be reinforced by the increase in the intensity of that current, so that a further rise in temperature will occur and so on. The temperatures thus reached may become very high and very dangerous, being able to cause the destruction of the corresponding storage cells.

Such a situation is well-known and it is observed when charging at a constant voltage sealed or semi-sealed storage cells in which the resorbing of the products of electrolysis formed under the influence of the charge current constitutes an exothermic reaction corresponding partly (at the end of charge) or totally (in over-charge) to the electrical energy sent into the storage cells by the charge. As soon as such a reaction is started up, the heat given off inside the storage cell has the effect of increasing the temperature. There then follows an increase in the intensity of the charge current, that increase causing, in its turn, a greater quantity of the products of electrolysis resorbed, whence a correlative giving off of increased heat. That cycle repeats iself, becoming amplified as it does so.

Such a phenomenon may also be observed at the time of the charge of storage cells of the open type when the heat due to ohmic losses or the like is not effectively dissipated toward the outside. A cycle similar to that which has just been described may then be established.

It has already been proposed that measures be taken against this thermal racing by detecting the end of the charge, that latter data being used for cutting the charge current or for reducing it greatly. That data may be constituted by a temperature threshold which the storage cells reach, or by an increase in the internal over-pressure in storage cells of the sealed type or by an increase of the voltage in storage cells of the open type.

It has also been proposed, that, instead of using the increase in voltage, the derivative of that voltage in relation to time factors be used, for example, as in British Pat. No. 1,097,451 and U.S. Pat. No. 3,424,969.

It should be stated that that system is firstly inaccurate and then inapplicable, for example, to sealed or semisealed storage cells in which no appreciable increase in working voltage is observed and in which may be noted, even, a slight decrease in the voltage.

It has also been proposed, in French Pat. No. 1,489,957 that the change in direction of the variation in the intensity of the charge current which firstly decreases and then increases, be used. This method, although interesting, lacks sufficient precision, because it is subjected to data of a quantitative kind in which the magnitude of the phenomena does not come into consideration. A simple change in the direction of variation of the charge current may cut the charge prematurely. On the other hand, the cutting of the charge current may occur for accidental causes which are not significant, such as, for example, in the case of an increase in the intensity of the transitory charge current.

The present invention proposes to overcome the abovementioned disadvantages and to provide means for obtaining increased precision and safety.

The object of the present invention is constituted by a method for limiting the charge of a storage cell battery charged at a constant voltage, characterized in that the said limiting comes into effect when the derivative of the charge current in relation to the time passes above a determined positive value.

According to another characteristic of the present invention, the said variation is assimilated to the ratio between the finite variation of the current during a short period, and the said period, it being possible to define that current variation by a proportional voltage variation.

According to a first variant for implementing the method, the said voltage variation is processed by an analog method consisting in comparing in a continuous way, the true voltage measured at a point, with the voltage obtained with a given delay, inserted in a circuit comprising at least a capacitor.

According to a second variant for implementing the method, the said voltage variation is processed by a logic method.

The invention also has as its object, devices enabling the implementing of the above methods.

Other characteristics and advantages of the invention will become apparent from the following description, which will be given with reference to the accompanying drawing by way of illustration but having no limiting character and in which:

FIG. 5a corresponds to a convertor circuit transforming the data coming from the measurement circuit into logic signals;

FIG. 5b corresponds to a treatment circuit for the said logic signals, and

FIG. 5c corresponds to a circuit for using signals sent out by the said processing circuit.

Figure 1:
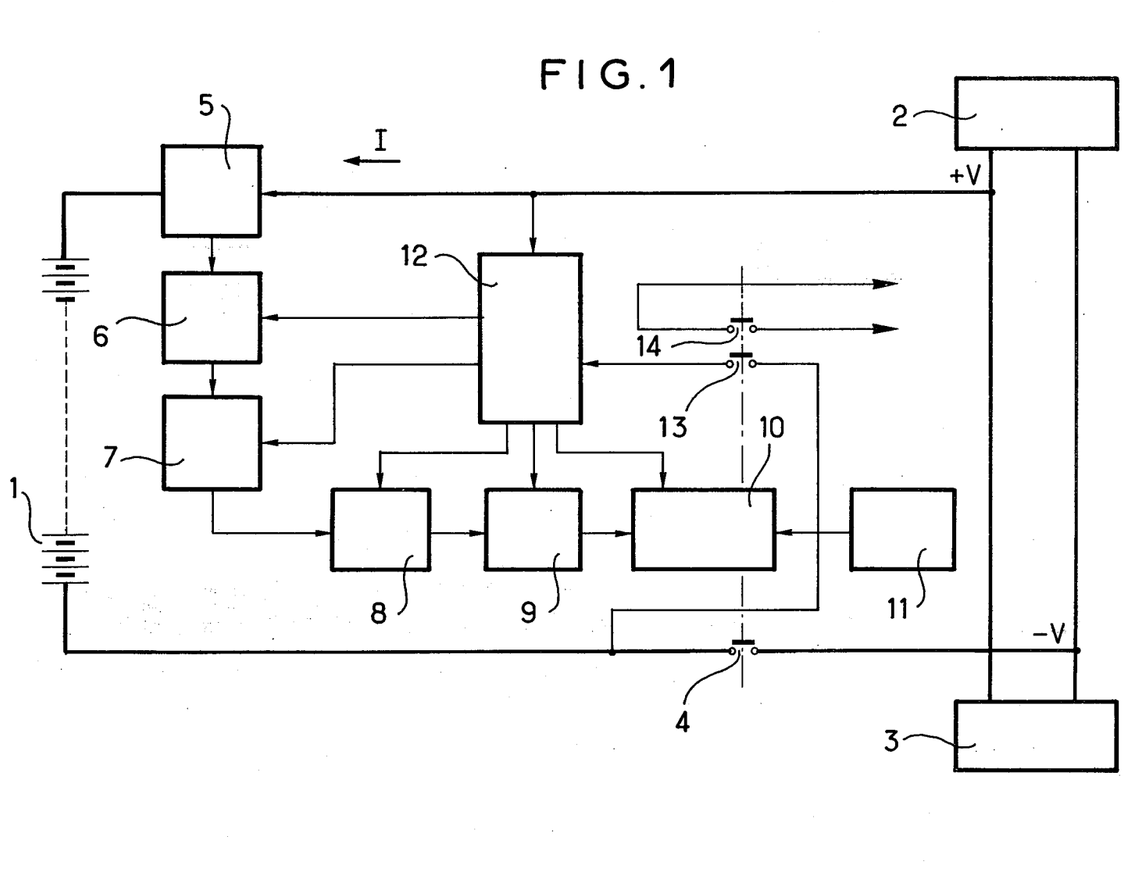
FIG. 1 is a block diagram of a device enabling the implementing of the method according to the invention.

FIG. 1 illustrates a storage cell battery 1 whose terminals (at the potentials +V and − V) are connected to a rectifier 2 feeding bus bars connected to a load circuit 3. The power circuit comprises, moreover, a separation contact switch 4 for the battery 1 and a transducer 5 for measuring the charge current I giving a voltage U = $f(I)$. The transducer 5 is, to great advantage, a shunt which provides a voltage U = kI. By way of example, a 0.2V shunt is used for a current of 25 C, C being the rated capacity of the storage cell battery 1. The transducer 5 can also be a Hall effect probe or a magnetic transducer.

The charge control circuit comprises:

An amplifier 6 for the voltage sent out by the transducer 5;

A differentiator 7 for the voltage coming from the amplifier 6;

A comparator 8 connected to the output of the differentiator 7;

An integrator 9 connected to the output of the comparator 8.

It should be observed that it is possible to arrange the integrator 9 at other points on the measurement circuit such as, for example, at the output of the amplifier 6.

An output and indicating or sensing element 10 connected to the output of the said integrator 9, and being capable of being reconnected by means of the reconnecting element 11;

A circuit 12 intended for feeding the amplifier 6, the differentiator 7, the comparator 8, the integrator 9 and the indicating element 10, connected up in the battery circuit through a contact switch 13. In the case where the transducer is a Hall effect probe or a magnetic transducer, it is fed also by the circuit 12.

The output and indicating element 10 controls the contact switches 4 and 13; the position of these contact switches is indicated at a distance by the auxiliary indicating contact switch 14. The contact switches 4, 13 and 14 may be connected together at a single contact switch having three contacts.

Figure 2:
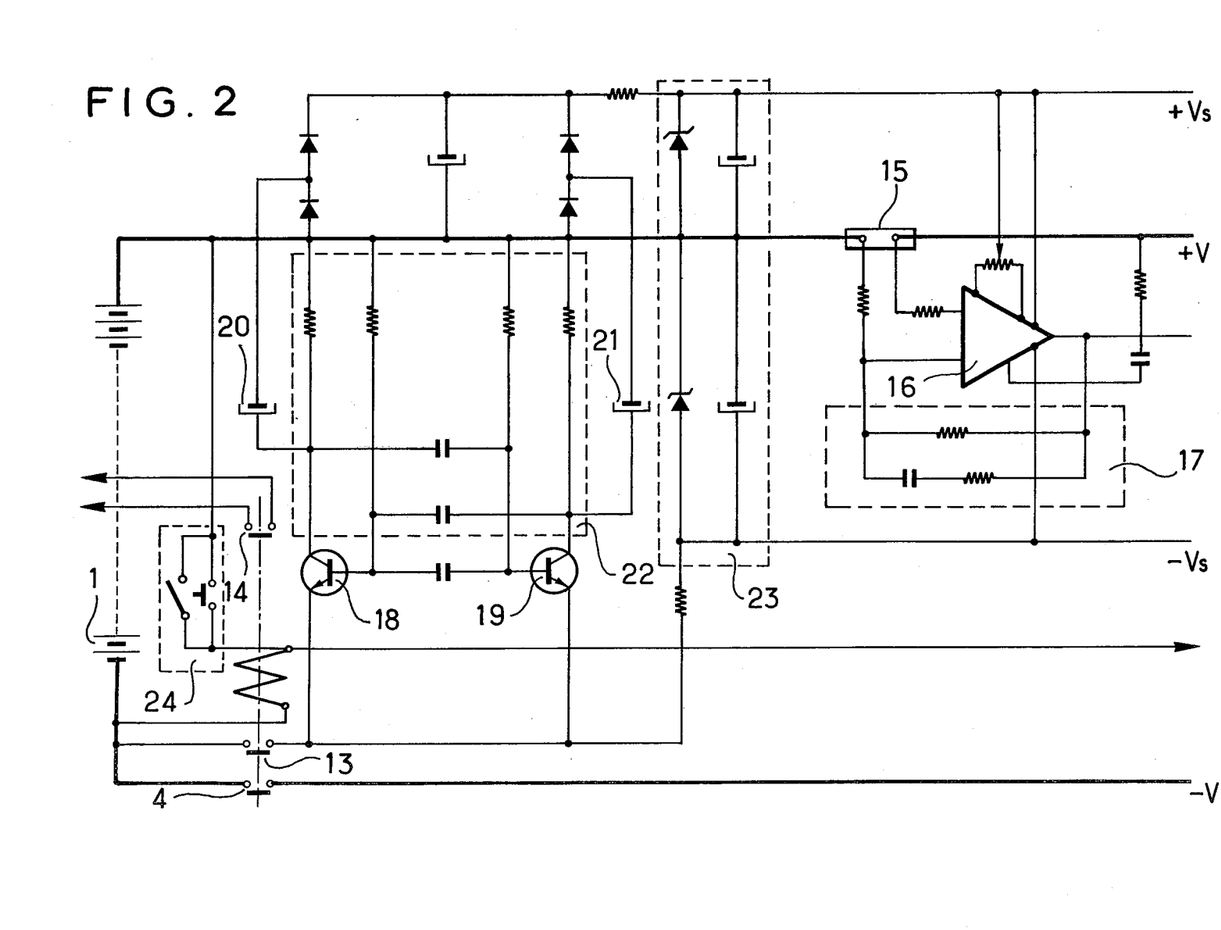
FIG. 2 is a diagram of an example of embodiment of the circuit for measuring the charge current of the battery connected with the feeding thereof.

FIG. 2 illustrates an example of embodiment of the transducer 5, of the amplifier 6 and of the supply circuit 12 in FIG. 1.

The transducer 5 is a shunt 15 connected up to the inputs of an integrated operational amplifier 16 equipped with a negative reaction circuit 17 which confers on it a very precise voltage gain and cancels the alternate component so as to measure the average current.

The amplifier 16 is fed by a stabilized voltage source whose terminals are referenced + $V_s$ and − $V_s$ and whose mid-point is connected to the + V potential point of the battery.

That supply circuit comprises, more particularly:

A multivibrator, constituted by transistors 18 and 19 connected with their networks RC 22, which oscillates at a stable frequency;

Two capacitors 20 and 21 which are respectively charged by the transistors 18 and 19 during their conductivity periods and which discharge providing power to the + $V_s$ circuit during their respective blocked periods.

Stabilization is effected by two Zener diodes connected with filtering capacitors, the assembly thereof being shown by the reference 23.

To avoid discharging the battery uselessly, the supply circuit is cut off by the contact switch 13 when the battery is isolated from the circuit by the contact switch 4. The reconnecting element has been shown by the reference 24.

EXAMPLE OF USE OF THE AMPLIFIER

The negative reaction is adjusted to obtain a gain of 1000 with the 0.2 V shunt previously defined.

In that case, the useful variation range for the output voltage is 10 V; a variation in intensity of 0.025 C in the charge current causes a voltage variation of 0.2 V at the output of the amplifier 16; it is thus possible to measure a current whose charge is comprised between 0 and 1.25 C.

Figure 3:
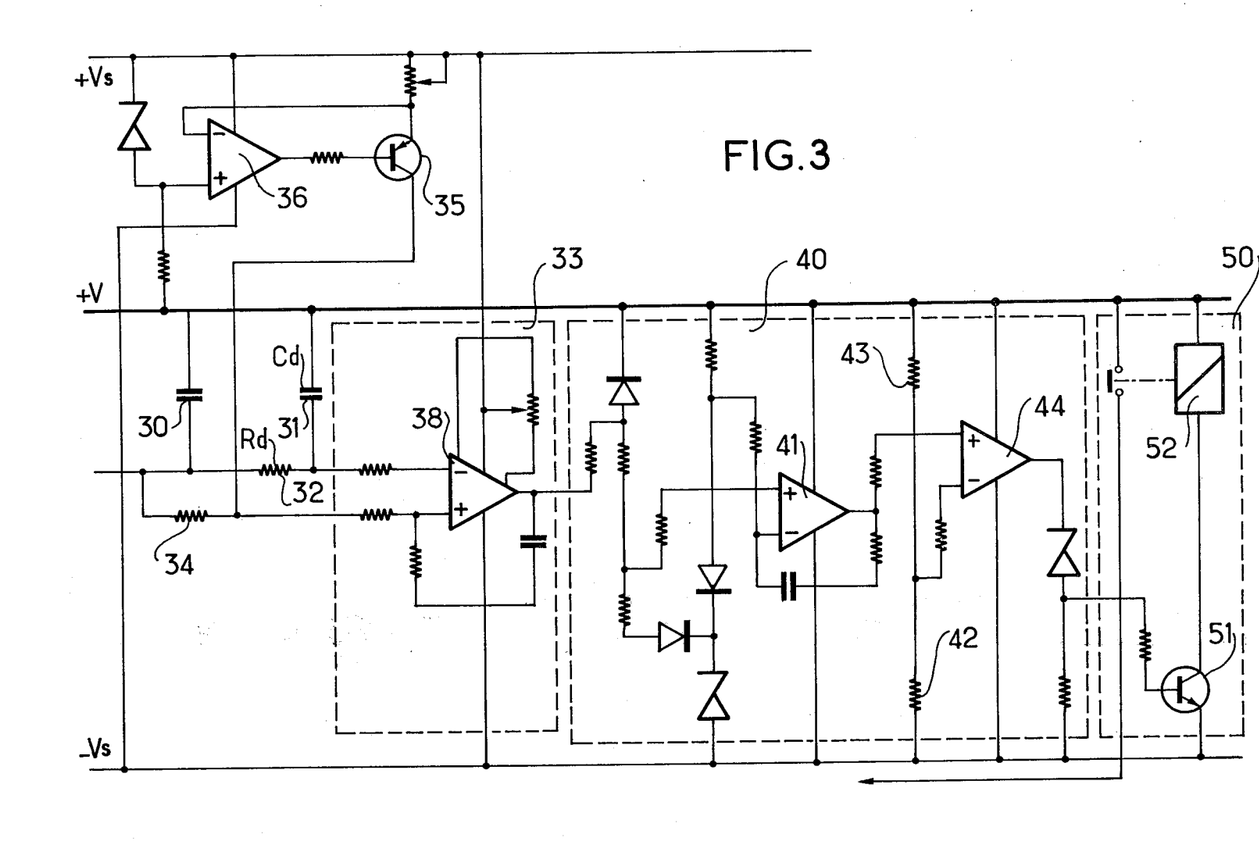
FIG. 3 is a diagram of an analog processing circuit for the signals sent out by the measurement circuit illustrated in FIG. 2.

FIG. 3 illustrates an example of an analog circuit for processing the signal U = KI coming from the amplifier 16, comprising the principal components diagrammatically shown in FIG. 1 by the references 7, 8, 9, 10.

The voltage U = KI coming from the amplifier 16 is applied to the terminals of a filter 30 which provides a voltage UF without delay. The capacitor 31, references Cd, connected to the capacitor 30 by a resistor 32 having a high value referenced Rd, applies to its terminals a voltage UCd. The assembly RdCd constutes a differentiator circuit corresponding to the element 7 in FIG. 1.

When UF does not vary: UCd is equal to UF.

When UF increases: UCd is less than UF.

When UF decreases: UCd is greater than UF.

The voltage UCd − UF is applied to an input of a comparator circuit 33 (corresponding to the component 8 in FIG. 1) comprising an integrated operational amplifier 38, whose input is formed by means of field effect transistors FET not shown and whose input impedance is very great in relation to the resistance Rd.

An adjustable reference voltage is applied to a second input of the comparator circuit 33; that reference voltage is obtained at the terminals of a resistor 34 by the passing of a constant current provided by a transistor 35 monitored by an amplifier 36.

The comparator assembly is adjusted so that the amplifier 38 fires when the voltage UCd − UF reaches the reference value corresponding to the instant at which the derivative of the charge current in relation to time passes above a determined positive value.

The output of the comparator circuit 33 is connected to the input of an integrator-time delay circuit 40 corresponding to the circuit 9 in FIG. 1.

The circuit 40 is connected up to the control circuit 50 of the contactor 13. The circuit 40 comprises an amplifier 41 which, after the firing of the amplifier 38, sends out a linear voltage ramp whose value increases negatively. When the ramp voltage reaches the same value as the voltage of the divider constituted by resistors 42 and 43, an amplifier 44 fires and causes the blocking of a transistor 51 setting off a relay 52. The relay 52 causes the opening of the contact switch 13.

Thus the controlling of the contact switch 13 is effected a certain time after the firing of the amplifier 38. That time constant, which may be in the order of a few minutes, enables the transitory variations in the charge current to be rid of.

The operation of the control system illustrated by FIG. 3 is explained as follows: In this system, the derivative of the signal U = KI is assimilated, with the ratio between a finite variation of that signal during a short period, and the said period. The voltage UF being the voltage in a given time t the voltage UCd is equal to the value which was assumed by the voltage UF at the time t − td, td being the constant of time of the circuit RdCd. The value of the differential voltage UCd − UF therefore corresponds to the variation speed of the charge current of the battery 1 and its sign depends on the direction of that variation.

It may be noted that the device which has just been described is made sensitive exclusively to the positive variations of the charge current of the battery. According to the arrangement shown in FIG. 3, the amplifier 38 can fire only when the quantity UCd − UF has a negative sign.

Figure 4:
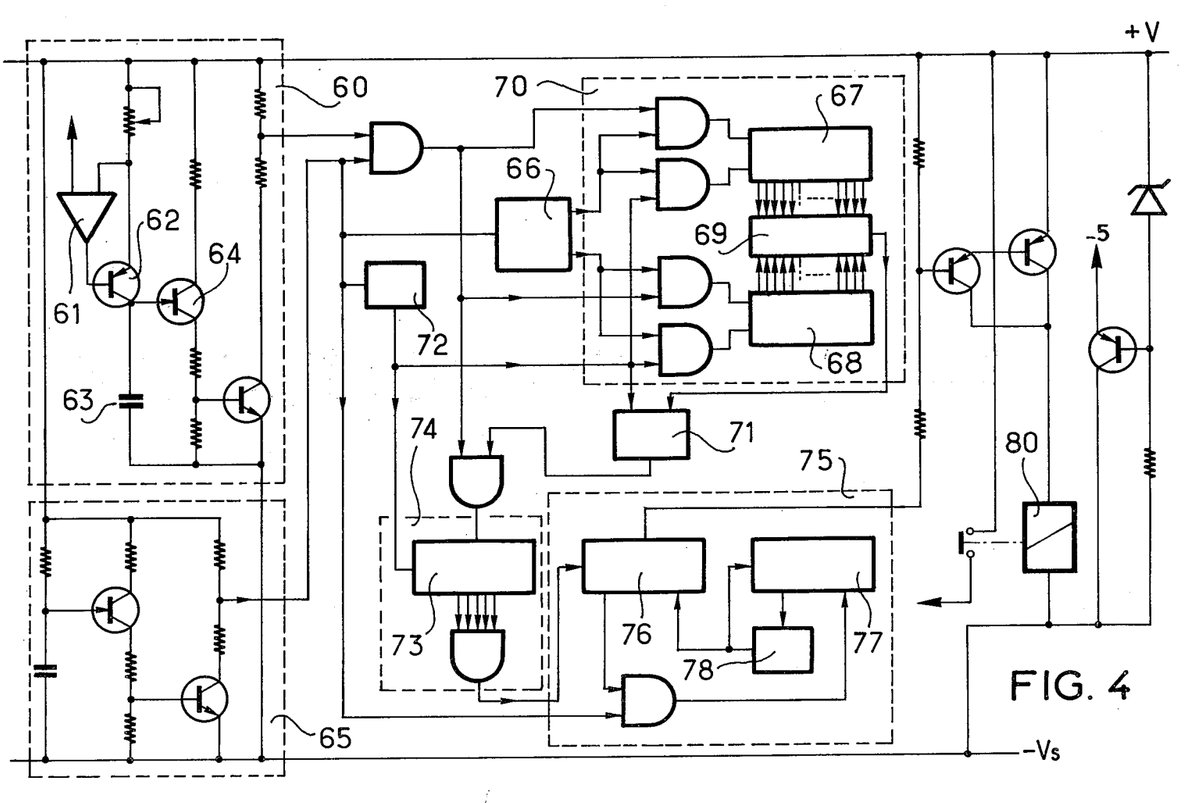
FIG. 4 is a diagram of a logic processing circuit for the signals sent out by the measurement circuit illustrated in FIG. 2.

FIG. 4 illustrates diagrammatically a logic device for controlling a signal sent out by the amplifier 16 (FIG. 2). Such a device comprises an element 60 for converting voltage data U = KI into frequency pulses proportional to the charge current; that element 60 comprises essentially an operational amplifier 61 connected with a transistor 62 charging a constant current capacitor 63 which discharges into a unijunction transistor 64. A clock 65 sends out pulses whose frequency is, for example, in the order of 0.1 c/s, applied to a bistable flip-flop 66. The pulses coming from the conversion circuit 60 and from the clock 65 are applied through the flip-flop 66 to a differential circuit 70 comprising a first counter 67, a second counter 68 and a comparator 69. During a period T1, the pulses of the circuit 60 are transmitted to the counter 67. During the following period T2 = T1, these pulses are transmitted to a counter 68. When the number of pulses stored in the counter 68 is equal to the number of pulses stored in the counter 67, the extra pulses are transmitted simultaneously to the counter 68 and, through the comparator 69 and from the flip-flop 71, to a comparator 74 comprising a counter 73. The functions of the counters 67 and 68 are reversed at each signal of the clock 65 and, from the instant when the two counters are on an equal level, the supplement of pulses is transmitted to the counter 73.

An auxiliary circuit 72 ensures the resetting to zero of the counter 73, of the flip-flop 71 and alternatively that of the counters 67 and 68 at each signal of the clock 65.

When the number of pulses stored in the counter 73 is equal to an input value, a data item is transmitted to a circuit 75 fulfilling the function of an integrator. Such a circuit comprises a counter 76, a counter 77 and a monostable flip-flop 78.

When it reaches its counting capacity, the counter 76 sends out a control signal to an element 80 connected to the contactor 13 illustrated in FIG. 2. As soon as a determined fraction of the said counting capacity of the counter 76 is reached (for example eight data items for 16 possible items), that counter affects the counter 77, allowing the arrival of constant pulses sent out by the clock 65.

In the case where the number of pulses stored in the counter 76 is less than the fraction of capacity previously defined, the flip-flop 78 resets to zero the two counters 76 and 77 and no control signal reaches the element 80. That arrangement ensures safety against possible interference or transitory variations in charge current, for it is necessary to obtain a certain number of successive analog data items during a determined period before isolating the battery.

The variant of embodiment which has just been described is, like the analog variant, made sensitive exclusively to positive current variations; indeed, if the number of pulses received by the counter 68 is less than or equal to that received by the counter 67, nothing happens. In the contrary case, the counter 73 is fed.

Figure 5A:
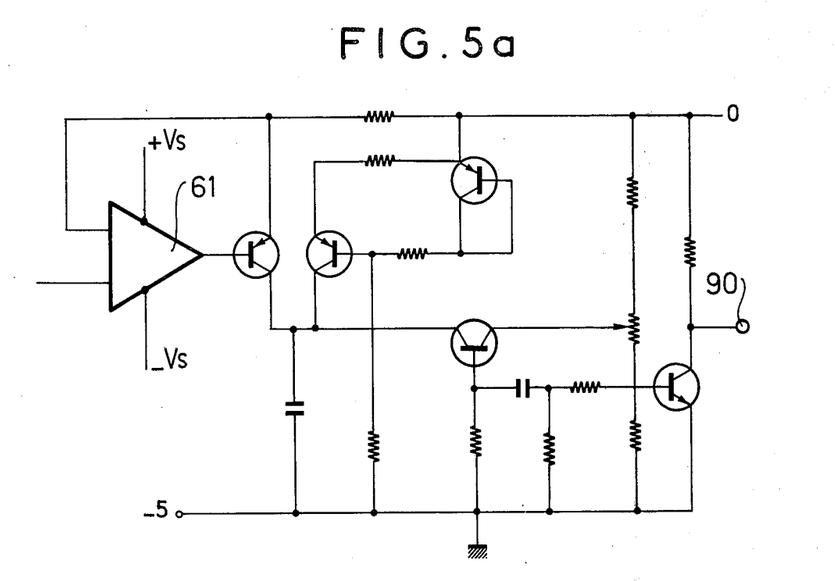
FIGS. 5a, 5b, 5c are detailed diagrams of a logic treatment circuit according to that in FIG. 4.

FIG. 5a is a detailed diagram of a variant of embodiment of the convertor circuit 60 in FIG. 4 sending out, at its output 90, pulses whose frequency varies with the value of the charge current of the battery 1.

That circuit is essentially characterized in that the unijunction transistor may be programmed, so as to obtain a better stability of that circuit. It comprises also a device enabling a response which is more linear in frequency to be obtained.

Figure 5B:
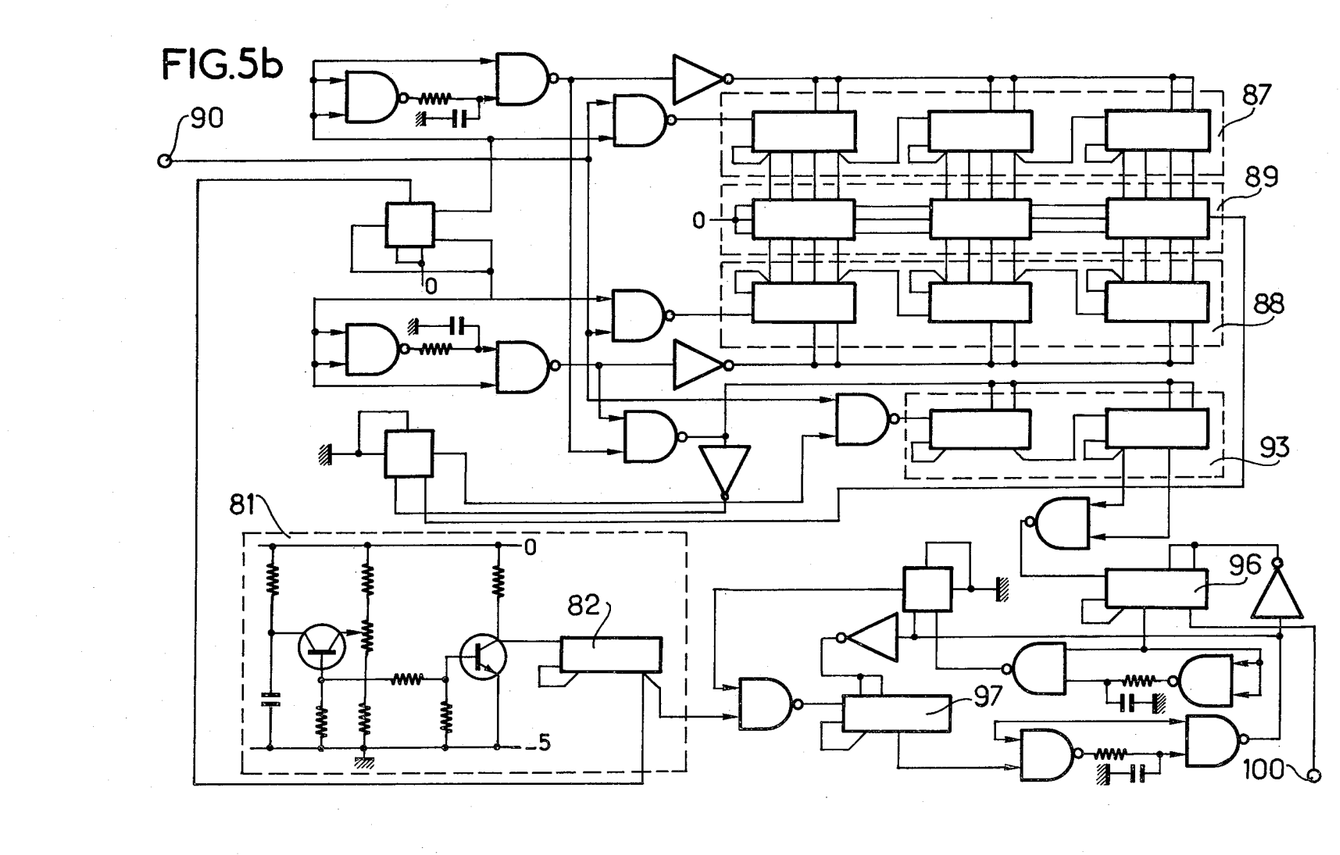

FIG. 5b is a detailed diagram of a variant of embodiment of the treatment circuit for the pulses 90 sent out by the circuit in FIG. 5a. A clock 81, corresponding to the clock 65 in FIG. 4, comprises a unijunction transistor which may be programmed, followed by a divider 82. The differentiator device comprises counters 87, 88 and a comparator 89. The comparator circuit is constituted by a counter 93 co-operating with an integrator circuit comprising a counter 96 fulfilling the function of an actual integrator and a system for resetting to zero constituted by the counter 97, connected with a monostable flip-flop. When the number of pulses stored in the counter 93 reaches the input value, a control signal is sent out at the output 100 of the processing circuit.

Figure 5C:
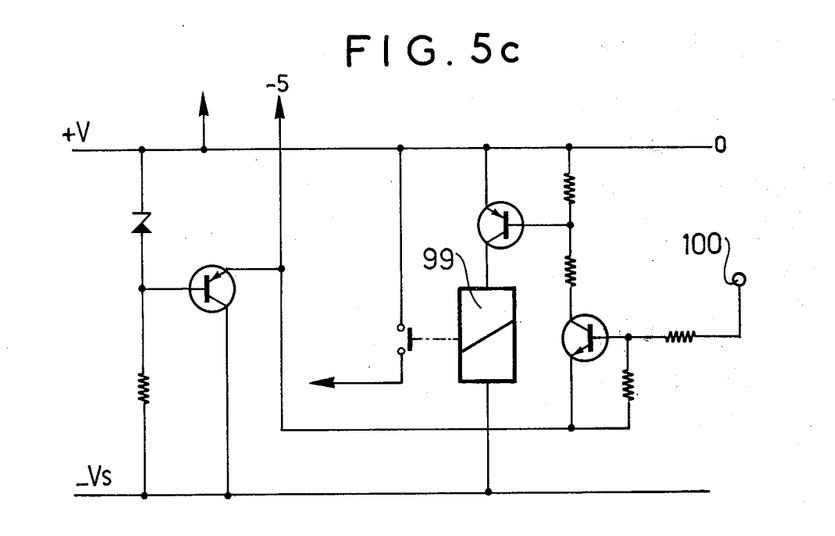

FIG. 5c is a detailed diagram of the control element of the contact switch 13, illustrated in FIG. 2, through an element 99 connected to the contact switch 13.

It will obviously be possible, without going beyond the scope of the invention, to replace the implementing devices which have just been described by equivalent devices. Thus, in the analog method, it will be possible to compare the voltages reached alternately by two capacitors subjected successively, during determined periods, to a voltage proportional to the charge current. In the logic method, it will be possible to measure the period of the pulses instead of their frequency.

But in any case, the choice of the derivative of the current in relation to time to establish data concerning the setting off of the thermal racing constitutes a very great progress. Indeed, that thermal racing is connected directly to the speed of increase in the intensity of the charge current. The method according to the invention enable all danger of thermal racing to be avoided; this was not the case when using different parameters which could indicate the end of the charge, such as, for example, internal overpressure, temperature, the value of the difference in potential at the terminals of the storage cell and even the derivative in relation to the time of that latter.

It should moreover be observed that there is a great distinction between the derivative of that difference in potential and the derivative of the charge current which flows through the said battery; indeed, by virtue of V = RI, the following is obtained:

$$\frac{dV}{dt} = \frac{dR}{dt} + \frac{dI}{dt}$$

It is therefore seen that dV/dt differs by dI/dt from the quantity dR/dt which is variable as a function of the polarization and of the state of charge of the electrodes, of the resistivity of the electrolyte which is a function of the temperature and even a function of accidental causes.

The method according to the invention is therefore, a particular advantage when great safety is indispensable, as for example, in aircraft batteries.

The invention applies more particularly to the charging of alkaline storage cell batteries.

What is claimed is:

1. Method for limiting the charge of a storage battery comprising charging the battery at a constant voltage, measuring the derivative of the current with respect to time and limiting charge of the battery in response to said derivative upon said derivative reaching a predetermined positive value.

2. Method according to claim 1, wherein said derivative for limiting charging current to the battery is assimilated to a determined value of the ratio between the finite variation of the charge current during a short period and said period, said current variation being definable by a proportional voltage variation.

3. Method according to claim 2, wherein limiting of charge current to the battery being charged by said current becomes effective only when said ratio is maintained above said determined value during a given interval of time.

4. Method according to claim 3, wherein said determined value is derived by determining the value of a corresponding variation of voltage proportioned to the intensity of the charge current.

5. Method according to claim 4 wherein said value of said variation of voltage is determined by analog comparison.

6. Method according to claim 5 wherein said analog comparison embodies comparing continuously a true voltage measured at a point at a given instant of time with voltage obtained with a given delay.

7. Method according to claim 5 wherein said analog comparison comprises comparing voltage during determined periods of time to voltage proportional to charging current.

8. Method according to claim 4 wherein said value of said variation of voltage is determined by logic comparison.

9. Method according to claim 8 wherein said logic comparison comprises transforming said variation in voltage into pulses whose frequency is proportional to said voltage.

10. A system for charging storage cells at constant voltage comprising means for supplying a charging current at constant voltage to such cells, means for limiting charge of the cells, means for measuring the derivative of the charge current with respect to time, and means responsive to said derivative reaching a predetermined positive value for then actuating said means for limiting charge of the cells.

11. A system according to claim 10, wherein said means for limiting charge of the battery comprises means for assimilating said derivative to a determined value of the ratio between finite variations of the charge current during a short period and said period, and defining said variation by a proportional voltage variation.

12. A system according to claim 11 including means whereby limiting of charge current to the battery being charged by said current becomes effective only when said ratio is maintained above said determined value during a given interval of time.

13. A system according to claim 11 including means for deriving said determined value in response to a variation in voltage proportion to the intensity of said charge current.

14. A system according to claim 13 wherein said means for deriving said determined value is an anolog comparison means.

15. A system according to claim 14 wherein said analog comparison means comprises means for comparing continuously a true voltage at a point at a given instant of time with voltage obtained with a given delay, and a capacitor-resistor containing circuit for introducing said given delay.

16. A system according to claim 14 wherein said analog comparison means comprises two capacitors subjectable during determined periods of time to voltage proportional to charging current.

17. A system according to claim 13 wherein said means for deriving said determined value of said variation in voltage is a logic comparison means.

18. A system according to claim 17 wherein said logic comparison means comprises means for transforming said variation in voltage into pulses whose frequency is proportional to said voltage.

19. A system for charging storage cells at a constant voltage comprising power supplying circuit means for supplying charging current at constant voltage to such cells and charge control circuit means for controlling and limiting charge of the battery when the derivative of charge current in relation to time rises above a determined value, said power supply circuit means including rectifier means connected thereto, switch means between the power circuit means operable to connect or disconnect said power circuit means and said storage cells, transducer means in said power supply circuit for measuring charge current at a voltage which is a function of said charge current, and said charge control circuit means comprising amplifier means for voltage derived from said transducer means, differentiator means connected to receive amplified voltage from said amplifying means, comparator means connected to receive output flow from said differentiator means and integrator means connected to receive output from said differentiator means, output indicating and sensing means connected to receive output of said integrator means, a second switch means, a feed circuit connectable in said power supply circuit by said second switch means for powering said amplifier means, said differentiator means and said output and sensing means, said output and sensing means controlling said two switch means, a third switch means also controlled by said output and sensing means, an integrated operational amplifier means including a negative reaction circuit means to provide a precise voltage gain and cancel the alternate component so as to measure average charging current, a stabilized voltage source to feed said integrated operational amplifier means, said stabilized voltage source including multi-vibrator means oscillating at a stable frequency and a pair of capacitors respectively charged during conductivity periods of said multi-vibrator means and discharged during blocked periods of said multi-vibrator means connected to the stabilized voltage source, and said second switch means serving to cut off said stabilized voltage source to said integrated operational amplifier means at the same time as said power supply circuit means in said battery is cut off.

20. A system according to claim 19 wherein said transducer means comprises a shunt connected to said integrated operational amplifier.

21. A system according to claim 19 wherein said multi-vibrator means comprises a network, a pair of transistors interconnected with said network for oscillating at a stable frequency, said pair of capacitors being connected to be respectively charged during conductive periods of said transistors and to discharge into said stabilized voltage source during blocked periods of said transistors.

22. A system according to claim 21 including filtering capacitors and zener diode means connected to stabilize said frequency of oscillation.

23. A system according to claim 19 including reconnecting means to restore connections at said switch means respectively subsequent to cut-off operation thereof.

24. A system according to claim 19 wherein said amplifier means, said differentiator means, said comparator means, said integrator means and said output indicating and sensing means are connected in an analog circuit, said analog circuit including filter means including a capacitor connected to receive output from said amplifier means to provide a fixed voltage, a second capacitor and a resistor connected thereto to provide a different voltage at terminals of said second capacitor providing said differentiator means so that when said first voltage does not vary, said second voltage is equal thereto when said first voltage increases, said second voltage is less than said first voltage and when said first voltage decreases, said second voltage is greater than said first voltage.

25. A system according to claim 24 wherein said comparator means comprises an integrated operational amplifier having an impedance very greatly larger relative to said resistor.

26. A system according to claim 24 including means to apply an adjustable reference voltage as a second input to said compactor means including a resistor, an amplifier and a transistor connected to provide said reference voltage across said resistor by passage through it of a constant current via said transistor and monitored by said last-named amplifier so that said last-named amplifier fires when the difference between said second-named voltage and said first voltage equals a reference value corresponding to that instant at which the derivative of said charge current in relation to time surpasses a determined positive value.

27. A system according to claim 24 wherein said comparator means is adjustable so that said last-named amplifier fires when the difference between said second voltage and said first voltage acquires a reference value corresponding to the instant at with a derivative of charge current in relation to time surpasses a determined positive value.

28. A system according to claim 24 including an integrator-time delay circuit to which output of said comparator current is connected.

29. A system according to claim 28 wherein said integrator-time delay circuit comprises an amplifier adapted to transmit a linear voltage ramp whose value increases negatively, a pair of resistors constituting a voltage divider, an amplifier, a transistor and a switch controlling relay connected together so that when said last-named amplifier is fired by attainment of equality of said ramp voltage and the voltage across said voltage divider, said last-named transistor is blocked to initiate a circuit opening operation of said relay at a determined time after firing of said last-named amplifier enabling elimination of transistory variations in charge current.

30. A system according to claim 19 including logic means for controlling signal output of said amplifier means.

31. A system according to claim 30 wherein said logic means includes conversion circuit means for converting voltage data output of said amplifier means into frequency pulses proportional to charge current of said system.

32. A system according to claim 31, including said flip-flop means, a differential circuit comprising a first counter, a second counter and clock means, said clock means emitting pulses of a determined frequency, and wherein said pulses proportional to charge current of said system are connected to and stored in said first counter for a given period of time, means for transmitting and storing said last-named pulses to said second counter during a period of time equal to said first-named period of time so that when the number of pulses transmitted and stored in said second counter equals the number stored in said first-named counter extra pulses transmitted to said first-named counter are transmitted simultaneously to said second-named counter, a comparator, a second flip-flop, a second comparator comprising a third counter connected to receive said extra pulses when the pulses received by said first and second counters are equal, integrator circuit means responsive to a determined number of pulses received by said third counter and operative to emit a signal at such occurrence, and a control means operative only when said signal from said integrator reaches said control means.

33. A system according to claim 31 wherein said conversion circuit means emits as its output pulses whose frequency varies with the value of the said charge current.

34. A system according to claim 33 including means responsive to attainment of equality of the number of pulses stored to the number of pulses delivered to said means to initiate delivery of a control signal for controlling charge current delivered by said system.

* * * * *

UNITED STATES PATENT AND TRADEMARK OFFICE
CERTIFICATE OF CORRECTION

PATENT NO. : 3,889,172
DATED : June 10, 1975
INVENTOR(S) : Daniel Lelaidier and Jean Quobex It is certified that error appears in the above-identified patent and that said Letters Patent are hereby corrected as shown below:

In the list of references cited in the preamble to the patent (Item 56) add:

The references to Delmolt, et al. No. 3,289,065 of November 29, 1966; Long No. 3,794,905 of Feb. 26, 1974 and Hennigan No. 3,426,263 of Feb. 4, 1969 cited in the Office Action of June 19, 1974.

Also, in column 7, line 40, "voltages" should read ---attained voltages---

Signed and Sealed this eleventh Day of November 1975

[SEAL]

Attest:

RUTH C. MASON
*Attesting Officer*

C. MARSHALL DANN
*Commissioner of Patents and Trademarks*